United States Patent
Yung et al.

(10) Patent No.: US 7,266,199 B2
(45) Date of Patent: Sep. 4, 2007

(54) INCORPORATING SHARED RANDOMNESS INTO DISTRIBUTED CRYPTOGRAPHY

(75) Inventors: Marcel M. Yung, New York, NY (US); Yair Frankel, Westfield, NJ (US)

(73) Assignee: CQRCert, New York, NY (US)

( * ) Notice: Subject to any disclaimer, the term of this patent is extended or adjusted under 35 U.S.C. 154(b) by 80 days.

(21) Appl. No.: 10/901,079

(22) Filed: Jul. 29, 2004

(65) Prior Publication Data

US 2005/0018840 A1    Jan. 27, 2005

Related U.S. Application Data

(63) Continuation of application No. 09/429,624, filed on Oct. 29, 1999, now abandoned.

(60) Provisional application No. 60/106,267, filed on Oct. 30, 1998.

(51) Int. Cl.
*H04K 1/00* (2006.01)
*H04L 9/00* (2006.01)

(52) U.S. Cl. .................... 380/255; 380/44; 380/46

(58) Field of Classification Search .............. 380/44, 380/46–47, 277, 279, 281–282, 285, 255; 713/176, 713/189
See application file for complete search history.

(56) References Cited

U.S. PATENT DOCUMENTS 5,764,767 A * 6/1998 Beimel et al. ............ 713/180
5,867,578 A * 2/1999 Brickell et al. ........... 713/180
6,035,041 A * 3/2000 Frankel et al. ............ 380/30

OTHER PUBLICATIONS

Gennaro et al., Robust and Efficient Sharing of RSA Functions, Aug. 18, 1996, Crypto-96'.pp. 157-172.*
Frankel, Y., et al., "Proactive RSA" Advances in Cryptology—Crypto '97. 17th Annual International Cryptology Conference, Proceedings, Santa Barbara, CA, Aug. 17-21, 1997, pp. 440-454.
Gennaro, R., et al., "Robust Threshold DSS Signatures", Advances in Cryptology—Eurocrypt '96, International Conference on the Theory and Application of Cryptographic Techniques, Proceedings, Saragossa, Spain, May 12-16, 1996, pp. 354-371.
Gennaro, R., et al., "Robust and Efficient Sharing of RSA Functions", Advances in Cryptology—Crypto '96, 16 Annual International Cryptology Conference, Proceedings, Santa Barbara, CA, Aug. 18-22, 1996, pp. 157-172.
Desmedt, Y., Threshold Cryptosystems:, Advances in Cryptology—Auscrypt '92, Workshop on the Theory and Application of Cryptographic Techniques, Proceedings, Gold Coast, Old Australia, Dec. 13-16, 1992, pp. 3-14.

* cited by examiner

*Primary Examiner*—Hosuk Song
(74) *Attorney, Agent, or Firm*—Steptoe & Johnson LLP

(57) ABSTRACT

A method of distributed cryptography for high consequence security systems which employs shared randomness between operating parties. Shared randomness is accomplished by sharing cryptographic keys stored in secure hardware tokens by potentially less secure software or general purpose computing units that perform distributed cryptography. The shared randomness is based on shared keys (at the tokens) and unique context. Shared random values are incorporated into the computation of partial results used in the distributed cryptographic calculation. The incorporation of shared randomness provides a hand-shake among the hardware tokens. When the operation is successful, a result is computed with assurance that the correct parties have taken part in forming the result. The hand-shake assures binding of operating parties and added system security.

31 Claims, 1 Drawing Sheet

INCORPORATING SHARED RANDOMNESS INTO DISTRIBUTED CRYPTOGRAPHY

This application is a continuation of application Ser. No. 09/429,624, filed Oct. 29, 1999, now abandonded, which application claims priority to provisional application Ser. No. 60/106,267, filed Oct. 30, 1998.

The invention relates to the field of electronics and data processing, and particularly to methods and apparatus for distributed cryptography incorporating shared randomness.

BACKGROUND

Distributed cryptography deals with cryptographic services which are distributed amongst parties so that a plurality of the parties have to take action to perform an act. For example, a cryptographic function may be re-represented as distributed pieces. When given an input, the parties holding the pieces have to come up with a quorum of themselves, and each member of the quorum activates its piece over the input, resulting in a partial result for each member of the quorum. The partial results are combined into a final result that correctly represents a cryptographic function such as decryption, signature, or any other function. More particularly, the function may be based, for example, on discrete logarithm over a prime field or other domain or functions based on hardness of factoring.

A shared cryptographic function provides a service which has built-in distributed trust. In distributed trust services using shared cryptographic functions, the service operation is typically presented as a single coherent element which is managed centrally to achieve a uniquely identified sensitive function. The service has decentralized control for security against insiders and for geographic and/or organizational trust distribution. Shared cryptographic functions support cryptographic services such as certification authority and key escrow. Requirements of state-of-the-art technology impose stronger security and operational constraints than those present in existing systems. These constraints have forced integration of various technological components, thus introducing more complicated workflow relationships. These workflow relationships tend to be more complicated than input-output relationships and may require more than just careful access-control mechanisms.

In high-end secure systems which are not isolated, one cannot rely solely on software modules, operating systems, and physical security. Secure hardware tokens are often included in high-end secure systems to enhance security protection. Alternatively, cryptographic modules, e.g., co-processors, may be added as well as other cryptographic facilities, e.g., hardware or software. Hardware tokens are hosted under the software of the general purpose computing units. Thus, hardware units do not communicate with each other directly. The hardware tokens are the "most protected" system components, and thus the most trusted elements of high-end secure systems. To assure "end-to-end" security at the highest level, the hardware tokens should provide security themselves. Such explicit security seems to require an explicit "hand-shake" among the components, i.e., the hardware tokens. Such explicit "hand-shake," however, overburdens the workflow by adding interactions, reduces performance, and adds to the required functionality by requiring mutual multi-party authentication of the limited computing environment at the hardware tokens.

The following references provide additional background of the invention and are incorporated herein by reference.

[A] R. J. Anderson, *Why Cryptosystems Fail*, Proceedings of the First Annual ACM Conference on Computer and Communications Security, CCS '93.

[B] R. Blakley, *Safeguarding Cryptographic Keys*, FIPS Con. Proc (v. 48), 1979, pp. 313–317.

[BF97] D. Boneh and M. Franklin, *Efficient Generation of Shared RSA Keys*, Crypto 97 proceedings.

[BDL] D. Boneh, R. DeMilo and R. Lipton, *On the Importance of Checking Cryptographic Protocols for Faults*, Eurocrypt 97.

[B88] C. Boyd, *Digital Multisignatures*, IMA Conference on Cryptography and Coding, Claredon Press, 241–246, (Eds. H. Baker and F. Piper), 1989.

[BGS] J. Bull, L. Gong and K. Sollins, *Towards Security in an Open Systems Federation*, Esorics 92.

[DDFY] A. De Santis, Y. Desmedt, Y. Frankel, and M. Yung, *How to Share a Function Securely*, ACM STOC '94, pp. 522–533.

[DF89] Y. Desmedt and Y. Frankel, *Threshold cryptosystems*, Advances in Cryptology-Crypto '97, pp. 307–315. Springer-Verlag.

[DF91] Y. Desmedt and Y. Frankel, *Shared Generation of Authenticators and Signatures*, Advances in Cryptology-Crypto '91, pp. 457–469. Springer-Verlag.

[DH] W. Diffie and M. Hellman, *New Directions in Cryptography*, IEEE Trans. on Information Theory 22(6), 1976, pp. 644–654.

[FIPS140] FIPS 140–1, *Security requirements for cryptographic modules*, National Institute of Standards and Technology, Jan. 1, 1994. (See also http://csrc.nist.gov/fips/)

[F89] Y. Frankel, *A practical protocol for large group oriented networks*, In J. J. Quisquater and J. Vandewalle, editor, Advances in Cryptology, Proc. of Eurocrypt '89, (*Lecture Notes in Computer Science* 773), Springer-Verlag, pp. 56–61.

[FGMY] Y. Frankel, P. Gemmel, P. Mackenzie and M. Yung. *Proactive RSA*, crypto 97.

[FGMY2] Y. Frankel, P. Gemmel, P. MacKenzie and M. Yung. *Optimal Resilient Proactive Public-Key Systems*, FOCS 97.

[FGY] Y. Frankel, P. Gemmel and M. Yung, *Witness Based Cryptographic Program Checking and Robust Function Sharing*. STOC96, pp.499–508.

[FMY] Y. Frankel, P. MacKenzie and M. Yung. *Robust Distributed Efficient RSA-key Generation*, manuscript.

[GJKR] R. Gennaro, S. Jarecki, H. Krawczyk, T. Rabin, *Robust Threshold RSA*, Crypto96, pp. 157–172.

[GGM] O. Goldreich, S. Goldwasser and S. Micali, *How to construct random functions*, J. Comm. Sci. 28 (1984), pp. 270–299.

[HJJKY] A. Herzberg, M. Jakobsson, S. Jarecki, H. Krawczyk, M. Yung, *Proactive Public-Key and Signature Schemes* Proceedings of the Fourth Annual ACM Conference on Computer and Communications Security, CCS '97.

[JA] M. Joseph, and A. Avizienis, *A Fault-Tolerance Approach to Computer Viruses*, IEEE Sym. on Security and Privacy, 1988, pp. 52–58.

[K] R. Kocker, *Timing Attacks on Implementations of Diffie-Hellman, RSA, DSA and Other Systems*, Crypto96.

[M] S. M. Matyas, *Key processing with control vectors*, Journal of Cryptology, 3(2), pp. 113–136, 1991.

[MT93] R. Molva and E. Tsudik, *Authentication Methods with Impersonal Token Cards*, IEEE Sym. on Security and Privacy, 1993, pp.56–65.

[OY] R. Ostrovsky and M. Yung, *How to withstand mobile virus attacks*, Proc. of the 10$^{th}$ ACM Symposium on the Principles of Distributed Computing, 1991, pp.51–61.

[RFLW] M. Reiter, M. K. Franklin, J. B. Lacy and R. N. Wright, *The Ω Key Management Service Proceedings* of the Third Annual ACM Conference on Computer and Communications Security, CCS '97.

[RSA] R. Rivest, A. Shamir and L. Adleman, *A Method for Obtaining Digital Signature and Public Key Cryptosystems*, Comm. of ACM, 21 (1978), pp. 120–126.

[Sh] A Shamir, *How to share a secret*, Comm. of ACM, 22 (1979), pp. 612–613.

[R] T. Rabin, *A simplified approach to Threshold and Proactive RSA*, Proceedings of Crypto 98, Spriner-Verlag, 1998, pp. 89–104.

[Y94] B. Yee, *Using Secure Coprocessors*, Ph.D. thesis, Carnegie Mellon University, Computer Science Tech. Report CMU-CS-94-149, May 1994.

SUMMARY

The present invention develops cryptographic mechanisms for high consequence security systems employing shared randomness between the operating parties. Using shared randomness and incorporating randomness into a distributed cryptographic operation allows end-to-end security by non-communicating hardware components within the high-end secure system. Shared randomness may be accomplished by sharing a cryptographic key stored in secure hardware tokens hosted by potentially less secure software and/or general purpose computing units, that perform a distributed cryptography (e.g., distributed RSA signing service). The shared randomness is integrated into the computation of the partial results in a distributed cryptography system. The integration of the shared randomness into the partial results achieves a hand-shake amongst the tokens. Namely, when the operation is successful, a result is computed with assurance that the right parties have participated in the computation. This assures binding of the operating parties, and overall the added shared randomness is added security to the system. Work load is balanced between the token and its host.

In a preferred embodiment of the invention a method of distributed use of cryptographic keys between a plurality of distributed electronic devices is developed in which the distributed electronic devices are capable of communication with a central server to develop a cryptographic output using shared random values. The method comprises the steps of: (a) computing shared values over a known and agreed context; (b) generating random values using the shared values; (c) generating a partial result for each device using the random values; and (d) computing an output based on the partial result.

BRIEF DESCRIPTION OF THE DRAWING

The present invention will be described below with reference to the attached drawing in which.

BRIEF DESCRIPTION OF THE PREFERRED EMBODIMENTS

Figure 1:
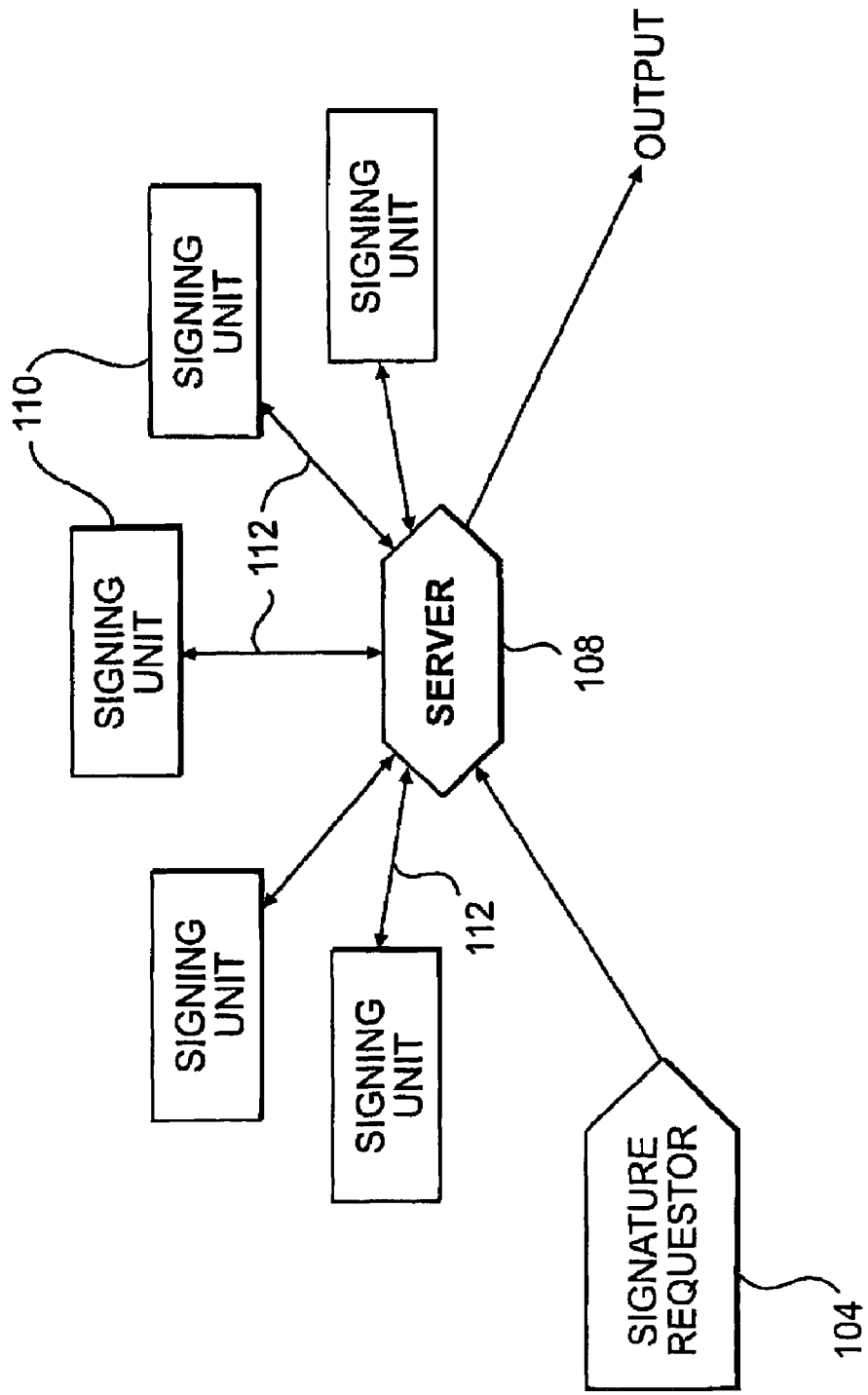
FIG. 1 is a block diagram illustrating horizontal separation of distributed cryptographic service architecture.

To achieve trust among hardware components, an explicit "end-to-end" hardware-to-hardware interaction, not relying on non-hardware components, may be used. Handshakes and mutual reliance may help in distributed systems to provide mutual verifications that increase system integrity, availability, and security [A, BGS]. When the hardware components are not directly connected, such handshakes cannot be performed directly. An implicit indirect verification of hardware units which complies with the vertical and horizontal separations of the architecture that is not resource consuming is needed.

An "implicit indirect hand-shake" via servers and the software units that connect them is possible using a new primitive. Operation using the new primitive will assure high-level "end-to-end" trust while maintaining the vertical layers. New secure algorithms and protocols achieve mutual multi-party trust at the management level. End-to-end security using the new primitive does not require the secure hardware token and can provide end-to-end security at the divisional units.

In general a high-end security system may be built with increased computational requirements. Hardware and software units may be added with relatively marginal added cost. The use of hardware is not so obvious when there are efficiency concerns because secure hardware is typically slow. I.e., hardware tokens are often times an "old generation" computing device by the time they are certified. In addition, not all hardware devices have accelerator chips to perform sufficiently large computation (2048 bit RSA accelerator chips are not prevalent today). Security may be reduced by lowering the security parameter, e.g., using a small composite RSA. A reduced security parameter is unacceptable because adversaries generally have the state-of-the-art equipment. Therefore, there is a need in which to balance security protection with performance. A trade-off between hardware performing some of the computing and the software unit of the computational device (e.g., a PC) performing the rest is needed. In general, for high-end security, additional computation should be tolerated (since the budget allows for additional computational devices to be added). This additional computation should not be performed at the costly secure hardware token layer. The methodology disclosed herein balances computational efficiency concerns.

Shared randomness is achieved between two or more entities by sharing a common key and applying a pseudorandom function or a pseudorandom number generator to generate a value that is common among the entities. Methods for sharing keys, pseudorandom functions, and pseudorandom number generators are procedures and notions which are known to those skilled in the art. By way of example, shared randomness methodology is applied to cryptographic calculations using the RSA algorithm. The RSA key generator produces two large random primes $p_1$ and $p_2$, and computes composite $n=p_1 \cdot p_2$ and the Euler toitent function $\phi(n)=(p_1-1)$. To determine the secret key, the generator chooses a random number d such that gcd(d, $\phi(n))=1$. The public key is n and e such that ed≡1 (mod $\phi(n)$). The one-way (hard) direction of RSA (used in decryption or signature of a message m) is $S_m \equiv m^d \pmod n$, whereas the public (easy) direction (used in encryptions and verification of signature) is $(S_m)^e \pmod n$ which returns m.

The RSA function is a building block for many secure systems where the adversary is allowed to initially access the system and get results based on various restrictions on the input, i.e., chosen plaintext encryption, random plaintext to be signed, etc.

Two types of separations of system elements are distinguished: Horizontal and Vertical.

Horizontal modules divide the architecture into divisional units with separate "trust domains." The domains are derived from the organizational structure, which can be defined by business structure, contracts, geography, security policy, etc. This structure defines the upper level layer that enforces organizational policy (trust relationships) and preferably fits within existing management workflow.

Vertical components divide the architecture into layers of technology boundaries: network interfaces, network firewalls and access control gates, operating systems, application software, and hardware tokens (as an example of trusted device). Other components such as humans (authorization of operators), physical security, and auxiliary and administration systems such as logging, tracing, secure synchronization, and recovery may be added. A further discussion in the context of the Q software key management system can be found at [RFLW].

Combining the horizontal and vertical components into a working architecture involves two basic design aspects—separations and bindings. Separations divide horizontally into divisional (organizational) modules and vertically into components in a divisional module. Bindings assure smooth collaboration among authorized elements only, both horizontally and vertically. The binding method disclosed minimizes security exposure and maintains the integrity of the cryptographic service.

FIG. 1 is an example of the horizontal module's workflow. A cryptographic service requester 104 is one or more entities which issues requests to the centralized management (defined by, for example, the organizational structure) asking for cryptographic service. The request is first sent to the server 108. This request, for instance, can be for issuing the organization's signature on a specified message or decryption of wiretapped cipertext. To protect against various attacks (e.g., man-in-the-middle), the cryptographic service requests are authenticated, usually with the requester's signature or otherwise. This is analogous to an upwards request in a mandatory integrity policy model. The server 108 forwards, over an authenticated channel 112, the request to the divisional units 110 and may also first negotiate which divisional units will participate in performing the cryptographic service (assuring availability and/or managing load balancing at the divisional unit level). After verifying the validity of the cryptographic service request and based on their specified security policy, the divisional units 110 perform a computation based on the information in the cryptographic service request and private information. The divisional units 110 then forward the output over an authenticated channel 112 to the server 108. When all the necessary divisional units respond, the server 108 is able to complete the requested cryptographic service. Then, the server 108 will grant the result to the requester 104, either in plain form or, if security is required, e.g., a decryption service, encrypted under the requester's key.

The divisional units 110 have a built-in redundancy when the number of divisional units required to perform the service is smaller than the total number of divisional units. Servers and cryptographic service requesters may be added to the system if high availability is required. Various maintenance procedures may be executed internally in the system, e.g., a secure time synchronization.

The horizontal units in the present example jointly perform RSA signing. Such distributed signing has been shown possible algorithmically (at some level of distribution or another) [B88, F89, DF91, DDFY, FGY, GJKR, FGMY, FGMY2]. An organization (centralized management), which is externally one entity, possesses an RSA signing public key, PK. The cryptographic objective of a distributed RSA function sharing system is to distribute the RSA signing capability so that any i or more units corresponding to divisional units can sign a message that is verifiable by PK, yet an adversary, with at most t−1 divisional units, cannot sign. This is the same protection as in secret sharing [B1, Sh], but in this example, the signing operation may be repeated as long as the key is valid. Analogous to the non-digital methods, the security policy and the internal organization signature approval structure should often be transparent to external entities. Transparency serves three purposes: (1) external parties prefer not be encumbered by and, generally cannot enforce, the signing party's policy and practices; (2) transparency ensures that external entities maintain compatibility independent of the internal structure and changes in internal structure; and (3) since external entities do not know who or how many individuals "approved," i.e., participated in, the signing of the message, internal organization secrecy is maintained, which is very important for certain organizations. The Basic IBM security modules and the RSA Certificate Issuing System (CIS) assume multiple agents control physical keys in order to operate the cryptographic unit. The physical keys hold electronic keys and other information and must be inserted into the device. In contrast, the present system employs distribution of trust among remote components that are hidden inside different vertical components and do not interact explicitly.

Secure hardware tokens provide some additional protection. In fact, current practices (for instance in banking and military applications) dictate the use of secure hardware mechanisms to enhance security protection. If hardware tokens do not have their own protected I/O between user and hardware token, and most do not, they cannot protect against operating system and application layer attacks in which "illegal" (unauthorized) inputs are submitted to the device. They, however, can protect the long-term private keys. Through the use of auditing, monitoring, virus detection, intrusion detection, proactive security [OY, HJJKY], etc., an attacker on software system that is well maintained may have only a short-term affect, which is acceptable in some scenarios.

Folding or incorporating the shared randomness based on shared keys into the computation modifies the original computation by further randomizing it. By incorporating shared randomness into the computation, bindings are created. The presence of components in the computation is assured without further checking. Shared random keys are typically used for encryption or authentication, but here they are used as computation-modifiers. Since they are shared, the modification at some location can be accounted for at another location or via computations done at that other location.

Hardware-Based Secure Distributed RSA Incorporating Shared Randomness

A first embodiment of the present invention incorporates shared randomness into a hardware-based secure distributed RSA system. Secure distributed RSA is optimized by using shared random key computation and achieves security in operation as long as no quorum of the divisional units is compromised. The elements signed by the software are allowed to grow relative to the size of the public key block (l is the number of units, L=l!, t-out-of l are needed to produce a signature). In the example below there is no distinction between hardware and software. The protocols described are useful when hardware tokens are not incorporated into the architecture.

Let $PRF_k(\cdot)$ denote a pseudorandom function indexed by the key k.

Pseudorandom functions are used here by way of example, but other shared key functions may be used.

Setup: The following one time setup is performed for shared values k.

Generate an RSA function having a public key (e,n) and a private key d.

Due to the extended Euclidean algorithm, the dealer can compute P, s✒ such that $$1 = eP + \frac{L^2}{H^2}s$$

✒where H=gcd(e,L). The dealer chooses a random polynomial $A(x)=A_0+A_1x+\ldots+A_{t-1}X^{t-1}$, such that $A(0)=A_0=L^2 \cdot k$✒and $A_j \in_R \{0,L,\ldots,2L^3n^{2+\epsilon}t\}$ for $1 \leq j \leq t-1$ (the polynomial is over a subset of the integer numbers: Z).

Entity i with public interpolation point $x_i=i$ receives secret shadow $s_i=A(x_i) \in Z$ and the Server receives public point P.

Each pair of entities (i,j) jointly generate a shared secret key for generating shared randomness $\sigma_{ij}=\sigma_{j,i}$ for the pseudorandom generator. This can be performed via Diffie-Hellman key exchange [DH] (with added authentication) or some other shared randomness generation technique.

The above key generation and share distribution is based on co-pending patent application Ser. No. 08/842,080, filed Apr. 28, 1997, titled Optimal Resilience, Proactive, Public-Key Cryptographic System and Method ("Optimal Resilience"), which is hereby incorporated by reference in its entirety. Using [BF97] and co-pending patent application Ser. No. 09/315,979, filed May 21, 1999, titled Robust Efficient Distributed RSA-Key Generation, which is hereby incorporated by reference in its entirety, one can employ a distributed dealer procedure among the hardware devices to produce a distributed trust of this sharing; hence not relying on any single entity.

Operational Phase: Let $\Lambda$ where $|\Lambda|=t$ be the divisional units designated to participant in the signing (they are available to the system's management at this point). The management Server notifies the members of $\Lambda$ what $\Lambda$ is. Signing is used as an example of incorporating shared randomness computation, but shared randomness may be used with other cryptographic functions (e.g., decryption).

Entity j computes $s$✒$_{mj,\Lambda}=s_j \cdot z_{j,\Lambda}+\{\Sigma_{v \in \Lambda \setminus \{j\}}\text{sign}(j-v) \cdot PRF_{\sigma_{j,v}}(m)\}$ where $z_{j,\Lambda}=\Pi_{v \in \Lambda \setminus \{j\}}(x_j-x_v)^{-1}(0-x_v)$.

Entity j transmits $S_{mj,\Lambda} \equiv m^{S_{mj,\Lambda}}$ mod n and transmits the result to the Combining Server.

The Combining Server computes signature of m, $S_m \equiv m^P \cdot \Pi_{v \in \Lambda} S_{m,v,\Lambda}$ mod n.

The Combining Server may "validate implicit handshake" and checks that:

$$(S_m)^e \stackrel{?}{\equiv} m(\text{mod } n).$$

The above protocol produces a secure and correct signature of a message m corresponding to public key (e,n). The sharing of the pseudorandom functions among the hardware units and their invocation in the computation generates a "t-wise hand shake" among the hardware components This creates a self-awareness property where the absence of a unit is detected as long as a single original unit is present. The distribution of the computed exponent into hardware exponent and software exponent has achieved the balancing between hardware and software as discussed below. Moreover, the sharing of the pseudorandom functions allow the protocol to be non-interactive, where the previous practical scheme of this nature required initial interaction to exchange true random bits.

A balancing between efficiency and adversarial setting (attacks) is provided by incorporating shared randomness. Software compromise and hardware compromise are distinguished using shared randomness.

Another embodiment of the present invention provides a scenario against an adversary which attacks a single device, the device is protected against timing attacks (due to exponentiation time channel being a pseudorandom function dependent but exponent independent), as well as attacks by an adversary performing I/O queries into a single device.

A modification of the operational phase allows for distinguishing between hardware and software at a divisional unit.

Operational Phase: Let $\Lambda$ where $|\Lambda|=t$ be the divisional units designated to participant in the signing. The divisional units are available to the system's management at this point). The management Server notifies the members of $\Lambda$ what $\Lambda$ is. Signing is used as an example of incorporating shared randomness computation, but shared randomness may be used with other cryptographic functions (e.g., decryption).

Entity j computes $s$✒$_{mj,\Lambda}=s_j \cdot z_{j,\Lambda}+\{\Sigma_{v \in \Lambda \setminus \{j\}}\text{sign}(j-v) \cdot PRF_{\sigma_{j,v}}(m)\}$ where $z_{j,\Lambda}=\Pi_{v \in \Lambda \setminus \{j\}}(x_j-x_v)^{-1}(0-x_v)$.

Entity j hardware provides to its software $S'_{mj,\Lambda} \equiv m^{S_{mj,\Lambda}-r}$, r mod n where r may be (pseudo) random bit string of length poly(log(n)) or zero (0). Use of zero may be preferred depending on hardware constraints.

Entity j now transmits $S_{mj,\Lambda} \equiv m^{S_{mj,\Lambda}-r}$, $m^r$ mod n based on the input it received from the hardware and transmits the result to the Combining Server.

The Combining Server computes signature of m, $S_m \equiv m^P \cdot \Pi_{v \in \Lambda} S_{m,v,\Lambda}$ mod n.

The Server may "validate implicit hand-shake" and checks that:

$$(S_m)^e \stackrel{?}{\equiv} m(\text{mod } n).$$

If an adversary has access to t or more of the computing devices, the adversary can sign any message, since it can authorize the signature request to the hardware tokens. It is assumed that hardware tokens only have I/O interfaces through software controlled devices. A signature interface between the Server/requester and the hardware tokens may be included to avoid unauthorized requests by the local or divisional unit. This protocol assumes both hardware and software have to be compromised at many locations, which is an improvement over a single module RSA, in which the adversary has only to compromise a single computing unit.

Another embodiment of the present invention addresses the situation where the adversary is assumed to break into "almost all" of the system, the adversary has access to the memory of v<t hardware devices and all t software units.

This adversary gets hold of all software units. It is thus necessary to ensure that the software retained within a hardware token suffices for hiding the exponent d.

This is an extremely strong adversary and strong assumptions are necessary to provide for both efficiency as well as security. It is a plausible assumption that some bits of d are known to be hard (hard to guess, as hard as finding d itself) even when the rest of the d is known. It is assumed that a fraction of the low order bits of d are hard. Other assumptions can be dealt with analogously.

Assumption: For $0 < e \leq 1$, revealing $\log n - (\log n)^e$ most significant bits does not reveal d. (Note: when e is small the upper half of d is easy to compute)

Strategy $_{i,\Lambda}(m)$ that is applied chooses a random number r in the range $[-h^{e+\delta}, +h^{e+\delta}]$ where $\delta > e$, which may force an increase in the size of domain from which the exponents are drawn. Such increase is always possible with RSA. $h = \log n$ is the security parameter.

The protocol can be as efficient as the number of plausible bits which must be hidden; $s_{m,j,\Lambda} - r$ can be chosen to minimize the multiplications the hardware token must perform. For example, a low hamming weight (small number of 1's in the string) or a short string (say, ½ the size of the share).

Pseudorandomness is uniformly produced by the devices, for example, using the same one way function-based on DES with publicly specified keys where its performance is message independent. Thus, timing attacks do not apply. Due to the pseudorandomness, an adversary which looks at the timing of the hardware device and tries to use the time channel to deduce the permanent share will fail. The reason for such failure is the blending of the pseudorandomness, which varies between messages and the random extraction of each exponents to be done in hardware. This creates a "random key schedule" at each execution and thus foils timing attacks.

Robust Computations with Reduced Communication Using Shared Randomness

Another embodiment of the present invention provides robust computations with reduced communication using shared randomness. If a server misbehaves, there may be no practicable way to determine who acted incorrectly. Trying all subsets of shareholders until a correct signature is computed is too expensive (e.g., when finding a subset of size $t = l/2 + 1$ of honest parties out of l it would be exponential in l). In these cases Robust Threshold RSA, in which the combining effort is efficient even when up to t parties are adversarial, may be required. Robust Threshold RSA was first introduced in [FGY, GJKR]. Namely, Robust Threshold RSA may provide safe assembly which is quickly computable and able to verify the information while providing isolation to the shares.

In order to verify that an acting server $i \in \Lambda$ sent a valid partial result, the following operation is performed with server i. The shared values added to computations presented here will save about half of the communication in the procedure compared with that of co-pending application Ser. No. 08/842,080 ("Optimal Resilience").

(Recall System setup) For each i the system publishes $g^{s_i L^2}$ mod n.

(User i Setup) Jointly generate shared-value keys $\sigma_{i,j} = \sigma_{j,i}$, $\sigma'_{i,j} \ldots \sigma'_{j,i}$, (for $1 \leq j \leq l$) with j and publish commitments $g^{\alpha_{i,j}} g_1^{r_{i,j}}, g^{\alpha'_{i,j}} g_1^{r'_{i,j}}$ where $g, g_1$ are of maximal order and discrete log of $g_1$ base g is unknown.

For a failed attempt in signing a message m by $\Lambda$:

Entity i publishes $R_{i,j} \equiv g^{L^2 s'_{m,i,\Lambda}} (g_1)^{PRF_{\sigma'_{i,j}(m)}}$ mod n, and $U_i \equiv \Pi_{j \in \Lambda}(g_1)^{PRF_{\sigma_{i,j}(m)} \pi'(i,j)}$ where $\pi'(j,v) = -\text{sign}(j-v)$ for $j \neq v$ and 1, otherwise.

Entity i or j publishes $R_{i,j} \equiv g^{PRF_{\sigma_{i,j}(m)} L^2} (g_1)^{PRF_{\sigma'_{i,j}(m)}} \equiv R_{i,j}$ (on each pair, only i or j need to publish and the other needs to verify).

A dispute declaration: if there is a dispute between i and j, then they open up their commitments to $\sigma_{i,j}$ and $\sigma'_{i,j}$ and one is removed (with an outlook, this removal is until a refresh for proactivization, as discussed below).

Each server j verifies the transition from a poly-share to a sum-share, namely that for all $i \in \Lambda \setminus \{j\}$:

$$(S_i)^{V_1} \stackrel{?}{\equiv} \left(U_i^{-1} \prod_{v \in \Lambda} (R_{i,v})^{\pi'(i,v)}\right)^{V_2} \text{ where } V_1 = \prod_{v \in \Lambda \setminus \{i\}} (0 - x_v) \text{ and}$$

$$V_2 = \prod_{v \in \Lambda \setminus \{i\}} (x_i - x_v).$$

If the verification does not pass then a dispute resolution is performed and server i is removed and a new $\Lambda$ is chosen to perform the signature.

Shareholder j publishes $Q_j = \Pi_{v \in \Lambda}(g_1)^{PRF_{\sigma_{i,j}(m)}}$ mod n.

A proof of knowledge of the discrete log $Q_j$ base $g_1$ is performed as described in [FGMY2]. (In practice a Fiat-Shamir transferable proof can be sufficient based on "ideal bash").

Use robustness algorithm of [FGY] or [GJKR] (for safe primes), using witness $g^{s'_{m,i,\Lambda} L^2} \equiv (\Pi_{v \in \Lambda} R_{v,i})/Q_i$ mod n.

If a shareholder is unable to perform the above, or if it has stopped in the middle of the entire protocol, it is eliminated and a new $\Lambda$ is used.

This operation is performed to locate cheaters if signing with the sum shares went wrong (and with an outlook, as part of the proactive update later).

This operation is successful in eliminating misbehaving parties. Furthermore, it enables in the fault-free case (e.g., all parties are honest and active in a round), a "non-interactive" robustness checking of the "sum shares generation" (when the Fiat-Shamir method is employed).

Because of the added efficiency burden, it is recommended that the system be run without robustness testing. Only when a proper signature fails for a particular message should the robustness enhancements be incorporated to eliminate cheaters.

Proactive Distributed RSA with Shared Randomness

Another embodiment of the present invention involves a proactive distributed RSA methodology using shared randomness. A proactive implementation of the communication model is discussed in [HJJKY]. The time is divided into time periods which are determined by the common global clock (e.g., a day, a week, etc.). Each time period consists of a short update phase, during which the servers engage in an interactive update protocol, at the end of which they hold new shares (in fact, a new sharing) of the secret d. After the update, there is a function computation phase, in which the servers perform the intended secret-key operation using their current sharing of d on numerous inputs.

The adversary is computationally bounded, and it can corrupt servers at any moment during a time period by viewing the memories of corrupted servers and/or modifying their behavior. One model does not differentiate malicious faults from "normal" server failures (e.g., crashes). But, when an adversary intruding on a shareholder is found it is "removed" (e.g., through a reboot procedure) before the shareholder is made operational. The reboot operation is performed immediately when attacks or deviations from the protocol are detected, and it is overcome during update.

Within the proactive model, a period for processors to fail by stopping and then rejoining (fail-stop and rejoin) may be allowed. Thus, an unavailable processor is not necessarily considered "faulty" in the malicious sense.

There are a number of ways shared randomness which is added into algebraic computations can help in proactive RSA systems. Full proactive update tokens are possible. In addition to share resharing, the pseudorandom functions should be replaced by new ones during updates. In fact, when the pseudorandom functions are first updated, a new shared randomness mechanism should be obtained, but the function itself should remain unchanged. Then interactions are reduced in the update. Change of representation "poly-to-sum" and "sum-to-poly" for the system, as described in co-pending application Ser. No. 08/842,080, may be performed. (Noting last two steps are not needed). The poly-to-sum protocol followed by a sum-to-poly based on renewed shared randomness, is a secure protocol with reduced interaction compared to the original poly-to-sum sum-to-poly update. The total number of servers may be changed from l to l', and the threshold may be changed from t to t' during an update.

Some dynamic updates that are less costly may be employed. One such change is updating the pseudorandom functions only. This can be done interactively between the parties, e.g., using Diffie-Hellman with either authenticated key exchange between the parties.

Since the parties share randomness, they can also perform what is called a contingent key exchange based on the Diffie-Hellman key exchange by incorporating shared randomness. As an example, let P be a prime, g a generator of large prime order of a subgroup of $Z_p$, and k be a shared random key. Diffie-Hellman key exchange is A send $g^a$ mod P and B send $g^b$ mod P and the key is $g^{ab}$ mod P, which can be computed by both A and B. A contingent Diffie-Hellman key exchange incorporates the share randomness into the transmissions. That is A and $g^{a+PRF_k("A",tag)}$ and B sends $g^{b+PRF_k("B",tag)}$ where tag is an agreed upon nonce. Similarly, it is easy to see that $g^{ab}$ can be computed by both A and B, e.g., B can compute $(g^{a+PRF_k("A",tag)}/g^{PRF_k("A",tag)})^b$. As soon as the key is used, e.g., for encryption, it can be determined if both agreed on the same key.

Proactivization can be used to dynamically add and remove parties (via an update). By limiting the operation to adding and removing from the recently updated group of parties, proactivization can also be accomplished by deciding to employ/not-employ the shared randomness shared with the recently updated parties. This is an access control function that computes on keys (analogous to "control vectors" acting on DES keys [M]). It assures that limitations on the cooperation can be easily achieved with shared randomness (using shared random values as credentials).

Shared random values can be used for key control, e.g., monitoring which parties collaborate. This key control can be used to prevent an entity from signing before a proactivization step is performed. For example, if an adversary has corrupted a server, it is possible to prevent that server from collaborating in a signature before proactivization.

Whereas full proactive refreshment of cryptographic tools is needed to assure that past corruptions (memories learned in the past) are forgotten (namely erased and become irrelevant), "simpler" mechanisms can be used to assure that future corruptions cannot learn the past. This is done by forward refreshment of the keys for shared values. This will ease the simulation arguments as the "pseudorandom past" becomes random. This can be achieved by updating the pseudorandomness based on "current round information" and in a non-interactive fashion. A tag (e.g., date or a counter which can be agreed upon) and previous randomness is used to generate a new pseudorandomness for shared values to add to computations as followed by an update. This can sometimes be extended to a full proactive update.

Using the above technique with [FGMY], fault-free non-interactive (e.g., all parties are honest and active in a round) full proactivization is achieved. This is the first time that such non-interactive maintenance is possible. It can be derived from [FGMY] by sharing pairwise affixments wherein each committee in a family one affixment adds and the other affixment subtracts using new locally refreshed pseudorandomness. The locally refreshed pseudorandomness is derived from the old key applied to a global tag which can be the global public state of this round. The new affixment keys generate new shares, followed by a non-interactive verification. The following is an example based on [F89], in which the secret key $d=s_{1+} \ldots +s_t$ similar to [FGMY]. The new shares now become $s'_i=s_i+\Sigma_{j=1\ldots i-1,i+1,t}\text{sign}(i-j)\text{PRF}_{\sigma_{i,j}}(\text{tag})$. Before changing the $s'_i$, a signature for some tag can be tested with the new shares. For [FGMY] there are many such sets $s_1, \ldots, s_u$ (held by a family of servers) such that they sum up to d, and more than one server can possess $s_i$.

For robustness of the update, a commitment to $\sigma_{i,j}$ is published as before. Moreover, the distributor (a single dealer or a distributed one) had published $g^{s_i}$, Publication of commitment to $\text{PRF}_{\sigma_{i,j}}$ (tag) is provided by i using say $C_{i,j} \equiv g^{PRF_{\sigma ij}(tag)}$. Entities i and j may now dispute if they disagree and value is opened if necessary (one will be wrong and removed). Each i also publishes $g^{s'_i}$ for the next round using his share, and the following verification is made by each v within a family, with dispute phase if necessary: $g^{s'_i} \equiv g^{s_i} \Pi_{j \in \Lambda \setminus \{i\}} (g^{PRF_{\sigma ij}(tag)})^{sign(i-j)}$. If no dispute, $s'_i$ is now used. As in [FGMY2] that l can be converted to l' and t can be converted to t'.

The efficiency gained by applying shared randomness into computations in updates of proactive systems, say, are definitely applicable to the scheme in [R] as well as to the scheme of "parallel sum-sharing" of [FGMY], which is very useful in relatively small scale systems. Other (non-RSA) distributed public-keys can employ this new primitive.

The description herein is exemplary and the notions described can be performed in multiple ways. For instance, the shared randomness does not need to be incorporated into the exponent, e.g., $\text{PRF}(\text{tag})g^a$ and $\text{PRF}(\text{tag})g^b$ can be used in the contingent Diffie-Hellman, as well as during the operational phase of RSA distributed signing (using instead partial signature $S_{m,j,\Lambda} \equiv (\Pi_{i \in \Lambda \setminus \{j\}} \text{PRF}_{\sigma_{i,j}}(m)^{sign(j-i)}) m^{s_{m,j,\Lambda}}$ mod n. Algebraic operations other than addition can be used with shared randomness techniques. For instance, if a distributed function is $V_t = g^{s_1 \cdots s_t}$ mod P by computing $V_i = (V_{i-1})^{s_i}$ where $V_0 = g$, one could use shared randomness as $Vi = (V_{i-1})^{s_i \Pi_{j=1 \ldots i-1, i+1, \ldots i} (PRF_{\sigma ij}(tag))^{sign(i-j)}}$.

The embodiments described herein are intended to be illustrative and not limiting. It will be appreciated that many variations are possible within the scope and spirit of the invention.

What is claimed is:

1. A method of distributed cryptographic computation using a plurality of distributed electronic devices, said method comprising:
   (a) computing shared values over a known and agreed context, each shared value being known by each member of a distinct subset of the plurality of distributed electronic devices;
   (b) a each of a plurality of the distributed electronic devices, generating a random value using said shared values;
   (c) at each of a plurality of the distributed electronic devices, generating a partial result for the distributed cryptographic computation using at least one of said random values; and
   (d) computing a final result for the distributed cryptographic computation using partial results.

2. The method of distributed cryptographic computation as recited by claim 1, wherein said shared values are random keys.

3. The method of distributed cryptographic computation as recited by claim 1, wherein said shared values are derived from a cryptographic protocol.

4. The method of distributed cryptographic computation as recited by claim 1, wherein said shared values are derived cryptographically.

5. The method of distributed cryptographic computation as recited by claim 1, further comprising the step of implementing a re-representation of a function.

6. The method of distributed cryptographic computation as recited by claim 1, wherein said partial results may include incorrect values.

7. The method of distributed cryptographic computation as recited by claim 1, wherein said steps (a)–(d) are performed iteratively.

8. The method of distributed cryptographic computation as recited by claim 7, further comprising changing said shared values after said step of generating an output based on said partial result.

9. The method of distributed crytographic computation as recited by claim 3, wherein said cryptographic protocol is a cryptographic function involving exponentiation.

10. The method of distributed cryptographic computation as recited by claim 3, wherein said cryptographic protocol is an RSA function.

11. The method of distributed cryptographic computation as recited by claim 1, wherein said shared values are stored in a hardware device in at least one of said distributed electomic devices.

12. A method of distributed cryptographic computation using a cryptographic value shared among a plurality of distributed electronic devices, said method comprising:
   (a) selecting a subgroup of devices to perform the distributed cryptographic communication;
   (b) computing shared values over a known and agreed context, each value being shared among a distinct subset of the subgroup of distributed electronic devices;
   (c) at each distributed electronic device of the subgroup, generating a random value using said shared values;
   (d) at each device of the subgroup of the distributed electronic devices, generating a partial result for the cryptographic computation using a share of the cryptographic computation value and at least one of said random values; and
   (e) computing a final result for the distributed cryptographic computation using partial results.

13. The method of distributed cryptographic computation as recited by claim 1, wherein each shared value is shared among a subset of the distributed electronic devices.

14. The method of distributed cryptographic computation as recited by claim 12, wherein each shared value is shared among a subset of the distributed electronic devices.

15. The method of distributed cryptographic computation as recited by claim 1, wherein each of the plurality of shared values is shared among a distinct subset of the distributed electronic devices.

16. The method of distributed cryptographic computation as recited by claim 12, wherein each of a plurality of shared values is shared among a distinct subset of the distributed electronic devices.

17. The method of distributed cryptographic computation as recited by claim 1, wherein each of a plurality of shared values is shared among a pair of the distributed electronic devices.

18. The method of distributed cryptographic computation as recited by claim 12, wherein each of a plurality of shared values is shared among a pair of the distributed electronic devices.

19. The method of distributed cryptographic computation as recited by claim 1, wherein each of a plurality of shared values is shared among a distinct pair of the distributed electronic devices.

20. The method distributed cryptographic computation as recited by claim 12, wherein each of a plurality of shared values is shared among a distinct pair of the distributed electronic devices.

21. The method of distributed cryptographic computation as recited by claim 1, wherein each of a plurality of shared values is (a) shared among a distinct subset of distributed electronic devices and (b) used to generate a partial result in a way that permits verification of correctness of a partial result.

22. The method of distributed cryptographic computation as recited by claim 12, wherein each of a plurality of shared values is (a) shared among a distinct subset of distributed electronic devices and (b) used to generate a partial result in a way that permits verification of correctness of a partial result.

23. The method distributed cryptographic computation as recited by claim 12, wherein the random values depend upon the particular devices selected for the subgroup.

24. The method of distributed cryptographic computation as recited by claim 1, wherein the cryptograph computation is based on an argument, and the generated random values are based on said argument.

25. The method of distributed cryptographic computation as recited by claim 12, wherein the cryptograph computation is based on an argument, and te generated random values are based on said argument.

26. The method distributed cryptographic computation as recited by claim 1, wherein the cryptographic computation comprises digital signing.

27. The method of distributed cryptographic computation as recited by claim 12, wherein the cryptographic computation comprises digital signing.

28. The method of distributed cryptographic computation as recited by claim 1, further comprising a step of using generated random values or shared values to detect misbehaving devices.

29. The method of distributed cryptographic computation as recited by claim 12, further comprising a step of using generated random values or shared values to detect misbehaving devices.

30. The method distributed cyrptographic computation as recited by claim 1, further comprising a step of proactively updating a secret cryptographic value used in the cryptographic computation.

31. The method of distributed cryptographic computation as recited by claim 12, further comprising a step of proactively updating a secret cryptographic value used in the cryptographic computation.

* * * * *